United States Patent [19]
Akutagawa et al.

[11] Patent Number: 4,559,501
[45] Date of Patent: Dec. 17, 1985

[54] SIGNAL TRANSLATING CIRCUIT

[75] Inventors: Tooru Akutagawa; Yukihiko Machida, both of Kanagawa, Japan

[73] Assignee: Sony Corporation, Tokyo, Japan

[21] Appl. No.: 564,099

[22] Filed: Dec. 22, 1983

[30] Foreign Application Priority Data

Dec. 30, 1982 [JP] Japan .................................. 57-234248

[51] Int. Cl.⁴ ........................... H03F 1/34; H03F 3/04
[52] U.S. Cl. .................................... 330/293; 330/288; 330/296; 330/310; 360/68
[58] Field of Search ............... 330/288, 293, 296, 310, 330/311; 360/68

[56] References Cited

U.S. PATENT DOCUMENTS 4,268,798 5/1981 Reichart ......................... 330/293 X

FOREIGN PATENT DOCUMENTS 840666 7/1960 United Kingdom ................ 330/293

Primary Examiner—James B. Mullins
Attorney, Agent, or Firm—Lewis H. Eslinger; Alvin Sinderbrand

[57] ABSTRACT

A signal translating circuit comprises first and second transistors connected to each other in such a manner that a collector of the first transistor is coupled with a base of the second transistor and an emitter of the second transistor is coupled with a base of the first transistor so as to form a negative feedback circuit arrangement, an input resistor connected between the base of the first transistor and a source of an input voltage signal for converting the input voltage signal into an input current signal to be supplied to the base of the first transistor, a biasing current source connected to the base of the first transistor, first and second current sources supplying the same currents and connected to the emitter of the first transistor and a collector of the second transistor, respectively, and means for deriving an output current signal from the collector of the second transistor.

6 Claims, 4 Drawing Figures

SIGNAL TRANSLATING CIRCUIT

BACKGROUND OF THE INVENTION

This invention relates to signal translating circuits suitable for use in a recording amplifier provided for recording a video signal in a video tape recorder of the helically scanning type and the like.

There has been previously proposed such a circuit as shown in FIG. 1 for forming a recording amplifier used for recording a video signal in a video tape recorder of the helically scanning type. This circuit contains therein a signal translating circuit performing voltage to current conersion, a major part of which is formed into an integrated circuit 10 composed of transistors $Q_1$ to $Q_9$ and so on which are arranged on a common semiconductor substrate. In the integrated circuit 10, the transistors $Q_1$ and $Q_2$ constitute an input current mirror circuit portion which is supplied with a DC biasing current $I_B$ flowing therethrough by the transistor $Q_3$ having its base supplied with a DC voltage $V_1$. The transistors $Q_5$ to $Q_8$ constitute an output current mirror circuit portion and the transistor $Q_9$ forms an output stage. The emitter of each of the transistors $Q_8$ and $Q_9$ is designed to be approximately fifty times as large in area as that of each of the transistors $Q_1$ to $Q_7$. An input terminal 11 is provided at the emitter of the transistor $Q_2$ connected to act as a diode and an output terminal 12 is provided at the collector of the transistor $Q_9$. Further, a power supplying terminal 13 and a ground terminal 14 are also provided. At the outside of the integrated circuit 10, a source 20 of a video signal which is to be recorded is connected through a resistor $R_1$ and a capacitor $C_1$ to the input terminal 11, and a primary winding of a rotary transformer 30 is connected between the output terminal 12 and the power supplying terminal 13. A secondary winding of the rotary transformer 30 is coupled with a coil of a magnetic head 40.

In the recording amplifier thus constituted, the resistance value in the forward direction of the transistor $Q_2$ connected to act as a diode and constituting the input current mirror circuit portion varies in response to a current flowing therethrough, and consequently an input signal current $i_{IN}$ is subjected to the second harmonic distortion thereof.

Generally, in the magnetic recording of a video signal, it is required to suppress a second harmonic distortion brought on a recording current to be less than minus forty decibels. For achieving such degree of suppression of the second harmonic distortion brought on the input signal current $i_{IN}$ with the recording amplifier shown in FIG. 1, it is necessary to cause the DC biasing current $I_B$ flowing through the input current mirror circuit portion to have a value more than twice as large as the peak to peak value of the input signal current $i_{IN}$, as shown in FIG. 2. In the case where the DC biasing current $I_B$ has such large value, since the transistor $Q_4$ is connected directly to the output current mirror circuit portion constituted by the transistors $Q_5$ to $Q_8$ to supply with the DC biasing current $I_B$ to the latter an output DC current $I_o$ flowing through the transistor $Q_9$ forming the output stage is also caused to have a value more than twice as large as the peak to peak value of an output signal current. This results in a disadvantage that the power consumption is undesirably increased.

Further, in the recording amplifier shown in FIG. 1, since both the DC biasing current $I_B$ and the output DC current $I_o$ are determined inside the integrated circuit 10, the value of each of the DC biasing current $I_B$ and the output DC current $I_o$ varies in response to variations in temperature in the integrated circuit 10, and it is very hard to completely compensate the DC biasing current $I_B$ and the output DC current $I_o$ for variations in value by utilizing resistors provided in the integrated cicuit 10 or the base-emitter voltage of a transistor provided in the integrated circuit 10. This results in a defect that an output recording current varies in response to temperature variations in the integrated circuit 10. The fact that the output recording current is determined inside the integrated circuit 10 also causes a further disadvantage that respective output recording currents are lacking in uniformity in the case where plural recording amplifiers of the above mentioned type and each comprising the integrated circuit 10 are provided.

OBJECTS AND SUMMARY OF THE INVENTION

Accordingly, it is an object of the present invention to provide a signal translating circuit performing voltage to current conversion, which is suitable for being constituted in the form of an integrated circuit and can avoid the above mentioned disadvantages and defects of the prior art.

Another object of the present invention is to provide a signal translating circuit in which a DC biasing current can be reduced without increasing distortions brought on a signal current.

A further object of the present invention is to provide a signal translating circuit which is operative with a reduced DC biasing current to deliver a signal current with suppressed distortions and therefore the power consumption in which is relatively small.

A still further object of the present invention is to provide a signal translating circuit which is operative with a reduced DC biasing current to deliver an output current signal with suppressed distortions and without variations in value due to temperature variations, and accordingly is suitable for being used to constitute a recording amplifier in a video tape recorder.

According to an aspect of the present invention, there is provided a signal translating circuit comprising first and second transistors connected to each other in such a manner that the collector of the first transistor is coupled with the base of the second transistor and the emitter of the second transistor is coupled with the base of the first transistor so as to form a negative feedback circuit arrangement, a biasing resistor connected to the base of the first transistor, an input resistor connected between the base of the first transistor and a source of an input voltage signal for converting the input voltage signal into an input current signal to be supplied to the base of the first transistor, first and second constant current sources supplying with the same constant currents and connected to the emitter of the second transistor and the collector of the second transistor, respectively, and means for deriving an output current signal from the collector of the second transistor.

In the signal translating circuit thus constituted in accordance with the present invention, the input current signal is almost free from the problem of distortions therein in the whole range in which the second transistor is in the active state and therefore a DC biasing current flowing through the second transistor can be reduced up to a value corresponding to a half of the peak to peak value of the input current signal. As a result, the power consumption in the circuit can be considerably reduced. Further, in the case where a major part of the circuit is formed into an integrated circuit and the biasing resistor is disposed at the outside of the integrated circuit, both DC and AC components of the output current signal are determined substantially in accordance with the arrangement at the outside of the integrated circuit and the output current signal which is not substantially affected with temperature variations in the integrated circuit can be obtained.

The above and the other objects, features and advantages of the present invention will become apparent from the following detailed description thereof in conjunction with the accompanying drawings.

DESCRIPTION OF THE PREFERRED EMBODIMENT

Figure 1:
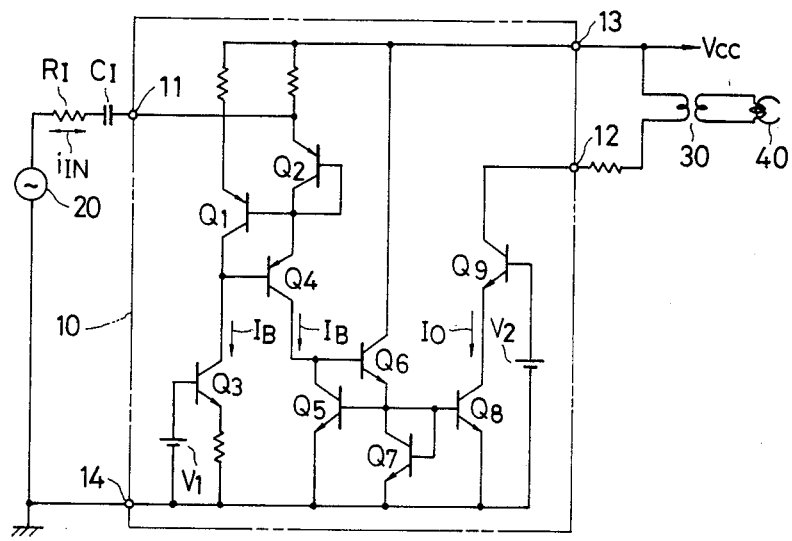
FIG. 1 is a circuit diagram showing a previously proposed signal translating circuit used in a recording amplifier.
Figure 2:
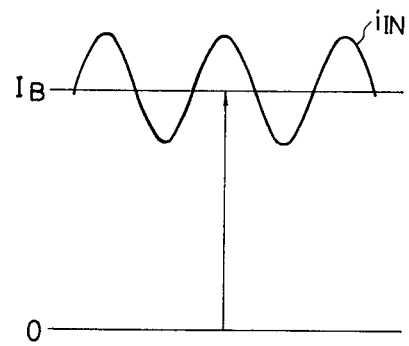
FIG. 2 is a waveform diagram used for explaining a DC biasing current in the circuit shown in FIG. 1.
Figure 3:
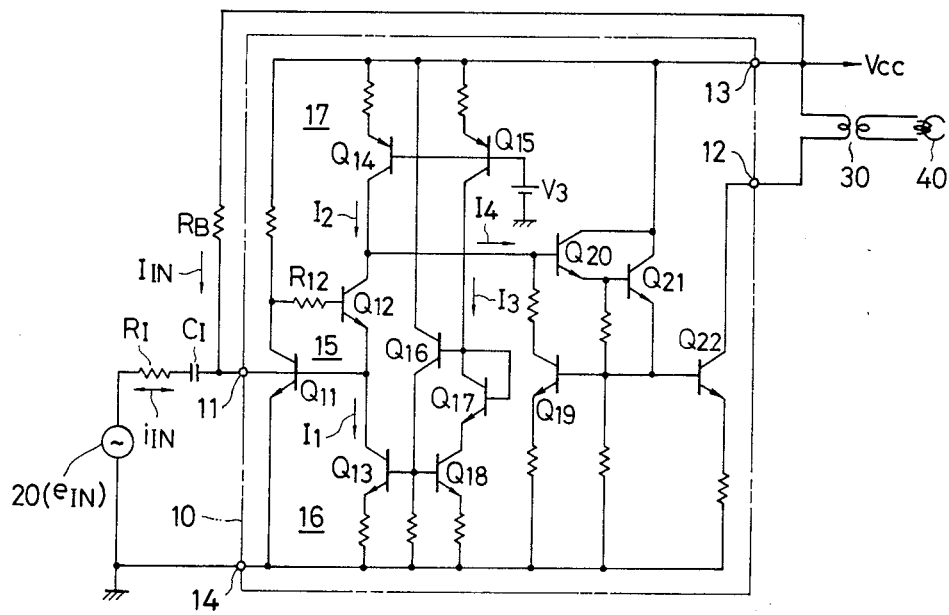
FIG. 3 is a circuit diagram showing one embodiment of signal translating circuit according to the present invention, which is used in a recording amplifier.

FIG. 3 shows an example of a signal translating circuit according to the present invention which performs voltage to current conversion and is used for constituting a recording amplifier for recording a video signal in a video tape recorder of the helically scanning type. In FIG. 3, elements and parts corresponding to those of FIG. 1 are marked with the same references and detailed description thereof will be omitted.

In this example, a major part of the circuit is formed into the integrated circuit 10 which is composed of transistors $Q_{11}$ to $Q_{22}$ and so on arranged on a common semiconductor substrate. The transistors $Q_{11}$ and $Q_{12}$ are connected to each other in such a manner that the collector of the transistor $Q_{11}$ is coupled through a resistor $R_{12}$ provided for preventing oscillation with the base of the transistor $Q_{12}$ and the emitter of the transistor $Q_{12}$ is coupled with the base of the transistor $Q_{11}$, so as to constitute a negative feedback circuit 15. The transistor $Q_{13}$ connected to the emitter of the transistor $Q_{12}$ forms a first constant current source 16 and the transistor $Q_{14}$ connected to the collector of the transistor $Q_{12}$ forms a second constant current source 17. The transistors $Q_{13}$ and $Q_{16}$ to $Q_{18}$ inclusive constitute a current mirror circuit connected to a third constant current source formed by the transistor $Q_{15}$. Further, the transistors $Q_{19}$ to $Q_{22}$ inclusive constitute a current mirror amplifying circuit and the transistor $Q_{22}$ forms individually an output stage. The emitter of the transistor $Q_{22}$ is designed to be approximately fifty times as large in area as that of each of the transistors $Q_{11}$ to $Q_{21}$. The inputterminal 11 is provided at the base of the transistor $Q_{11}$ where is a feedback point in the negative feedback circuit 15, and the output terminal 12 is provided at the collector of the transistor $Q_{22}$. At the outside of the integrated circuit 10, a biasing resistor $R_B$ is connected between the input terminal 11 and the power supplying terminal 13. Further, the source 20 of the video signal (input voltage signal $e_{IN}$) which is to be recorded is connected through the resistor $R_1$ and the capacitor $C_1$ to the input terminal 11, and the rotary transformer 30 to which the magnetic head 40 is coupled is connected between the output terminal 12 and the power supplying terminal 13.

In the signal translating circuit constituted as mentioned above in accordance with the present invention, the input voltage signal $e_{IN}$ from the source 20 is supplied to the resistor $R_1$ to be converted thereby into the input current signal $i_{IN}$ and the input current signal $i_{IN}$ thus obtained is supplied to the input terminal 11. The transistor $Q_{14}$, which forms the second constant current source, is maintained in the active state in consequence of being supplied with a voltage $V_3$ to the base thereof and supplies a constant current $I_2$ therefrom. The transistor $Q_{15}$, which forms the third constant current source, is also maintained in the active state in consequence of being supplied with the voltage $V_3$ to the base thereof and supplies a constant current $I_3$ flowing therethrough into the current mirror circuit constituted by the transistors $Q_{13}$ and $Q_{16}$ to $Q_{18}$. In the current mirror circuit consituted by the transistors $Q_{13}$ and $Q_{16}$ to $Q_{18}$, a constant current $I_1$ flows through the transistor $Q_{13}$ in response to the constant current $I_3$ flowing through the transistors $Q_{17}$ and $Q_{18}$ due to the current mirror operation therein. The constant current $I_2$ of the second constant current source 17 and the constant current $I_3$ of the third constant current source are determined to be equal to each other and the constant current $I_1$ of the first constant current source and the constant current $I_3$ are also determined to be equal to each other, so that the constant current $I_1$ is equal to the constant current $I_2$. When the signal translating circuit operates in such a manner, an output current signal, which is obtained in response to the input current signal $i_{IN}$ supplied to the negative feedback circuit 15, is derived from the current mirror amplifying circuit constituted by the transistors $Q_{19}$ to $Q_{22}$ inclusive from the collector of the transistor $Q_{12}$ and an amplified output current signal is supplied to the rotary transformer 30 through the transistor $Q_{22}$ which forms the output stage. As a result of this, a recording current flows through the magnetic head 40 in response to the amplified output current signal supplied to the rotary transformer 30.

Figure 4:
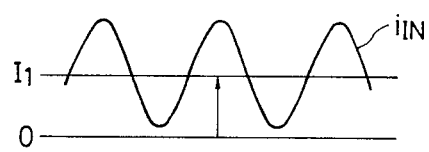
FIG. 4 is a waveform diagram used for explaining a DC biasing current in the embodiment shown in FIG. 3.

In this signal translating circuit, since the input terminal 11, to which the input current signal $i_{IN}$ is supplied, is provided at the base of the transistor $Q_{11}$ forming the feedback point in the negative feedback circuit 15 constituted by the transistors $Q_{11}$ and $Q_{12}$ and consequently the potential of the input terminal 11 is maintained to be constant, the input impedance at the input terminal 11 as viewed from the source 20 becomes substantially zero. Accordingly, the input current signal $i_{IN}$ depends upon only the input voltage signal $e_{IN}$ from the source 20 and the resistor $R_1$, and the following equation is satisfied:

$$i_{IN} = \frac{e_{IN}}{R_1} \quad (1)$$

where $i_{IN}$, $e_{IN}$ and $R_1$ stand for the current value of the input current signal $i_{IN}$, the voltage value of the input voltage signal $e_{IN}$ and the resistance value of the resistor $R_1$, respectively. This means that the input current signal $i_{IN}$ is almost free from the problem of distortions therein in the whole range wherein the transistor $Q_{12}$ is maintained in the active state, and therefore a DC biasing current to the transistor $Q_{12}$, which is the constant current $I_1$, can be reduced up to a value corresponding to a half of the peak to peak value of the input current signal $i_{IN}$, as shown in FIG. 4.

Further, in this signal translating circuit, since the output current signal is derived from the collector of the transistor $Q_{12}$, the difference between the constant current $I_2$ of the second constant current source 17 and a DC current $I_4$ contained in the output current signal is equal to the difference between the constant current $I_1$ of the first constant current source 16 and a DC biasing current $I_{IN}$ supplied through the biasing resistor $R_B$ provided at the outside of the integrated circuit 10, that is, the equation: $I_2 - I_4 \times I_1 - I_{IN}$ is satisfied. Since the constant current $I_1$ is equal to the constant current $I_2$, as aforementioned, the DC current $I_4$ contained in the output current signal is equal to the DC biasing current $I_{IN}$ flowing through the biasing resistor $R_B$, and assuming that a power source voltage $V_{CC}$ is supplied to the power supplying terminal 13 and a base-emitter voltage $V_{BE}$ is obtained between the base and emitter of the transistor $Q_{11}$, the following equation is satisfied:

$$I_4 = I_{IN} = \frac{V_{CC} - V_{BE}}{R_B} \quad (2)$$

where $R_B$ stands for the resistance value of the biasing resistor $R_B$. Accordingly, the DC current contained in the output current signal is substantially determined by the arrangement at the outside of the integrated circuit 10. In one concrete example, $I_1$ and $I_2$ are selected to be 300 μA, $I_{IN}$ and $I_4$ are selected to be 500 μA and a DC current flowing through the transistor $Q_{22}$ is selected to be 40 mA.

As described above, with the signal translating circuit according to the present invention which performs voltage to current conversion, the DC biasing current can be reduced up to a value corresponding to the peak value of the input current signal and, as a result, the power consumption can be considerably reduced. Further, the output current signal which is determined in accordance with the arrangement provided at the outside of the integrated circuit is not affected substantially with temperature variations in the integrated circuit, and therefore a stable recording current based on such an output current signal can be obtained in the case where the circuit is used for constituting a recording amplifier in a video tape recorder and the like.

What is claimed is:

1. A signal translating circuit for supplying an output current signal, comprising;
    negative feedback means including first and second transistors each having a base, a collector, and an emitter, said collector of said first transistor coupled to said base of said second transistor and said emitter of said second transistor coupled to said base of said first transistor;
    biasing current source means connected to said base of said first transistor;
    input resistor means connected between said base of said first transistor and a source of an input voltage signal for converting said input voltage signal into an input current signal to be supplied to said base of said first transistor;
    first constant current source means connected to said emitter of said second transistor for supplying a first constant current flowing to said emitter of said second transistor, said first constant current being selected to be substantially equal to a half of the peak-to-peak value of said input current signal;
    second constant current source means connected to said collector of said second transistor for supplying a second constant current, substantially equal to said first constant current, to said collector of said second transistor; and
    means for deriving said output current signal from said collector of said second transistor.

2. A signal translating circuit according to claim 1, wherein said source of the input voltage signal is AC-coupled to said base of said first transistor.

3. A signal translating circuit according to claim 1, wherein said biasing current source means comprises resistor means connected between said base of said first transistor and a power supplying terminal.

4. A signal translating circuit according to claim 1, wherein said means for deriving said output current signal comprises a current mirror amplifying circuit having an input terminal connected to said collector of said second transistor and an output terminal connected to a load.

5. A signal translating circuit for supplying an output current signal, comprising:
    negative feedback means including first and second transistors each having a base, a collector, and an emitter, said collector of said first transistor coupled to said base of said second transistor and said emitter of said second transistor coupled to said base of said first transistor;
    input resistor means connected between said base of said first transistor and a source of an input voltage signal for converting said input voltage signal into an input current signal to be supplied to said base of said first transistor;
    first constant current source means connected to said emitter of said second transistor for supplying a first constant current flowing to said emitter of said second transistor;
    second constant current source means connected to said collector of said second transistor for supplying a second constant current to said collector of said second transistor;
    third constant current source means coupled to said first constant current source and said second constant current source means for controlling said first constant current source so that said first constant current is substantially equal to said second current; and
    means for deriving said output current signal from said collector of said second transistor.

6. A signal translating circuit for supplying an output current signal, comprising:
    negative feedback means including first and second transistors each having a base, a collector, and an emitter, said collector of said first transistor coupled to said base of said second transistor and said emitter of said second transistor coupled to said base of said first transistor;
    resistor means coupled between said base of said second transistor and said collector of said first transistor for preventing oscillations;
    input resistor means connected between said base of said first transistor and a source of an input voltage signal for converting said input voltage signal into an input current signal to be supplied to said base of said first transistor;

first constant current source means connected to said emitter of said second transistor for supplying a first constant current flowing to said emitter of said second transistor;

second constant current source means connected to said collector of said second transistor for supplying a second constant current, substantially equal to said first constant current, to said collector of said second transistor; and means for deriving said output current signal from said collector of said second transistor.

* * * * *